United States Patent
Marchaj et al.

(10) Patent No.: US 10,539,156 B2
(45) Date of Patent: Jan. 21, 2020

(54) VARIABLE DISPLACEMENT FLUTTER DAMPER FOR A TURBOFAN ENGINE

(71) Applicant: UNITED TECHNOLOGIES CORPORATION, Farmington, CT (US)

(72) Inventors: Ian T. Marchaj, Old Saybrook, CT (US); Glenn Levasseur, Colchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 324 days.

(21) Appl. No.: 15/452,641

(22) Filed: Mar. 7, 2017

(65) Prior Publication Data

US 2018/0258956 A1    Sep. 13, 2018

(51) Int. Cl.
*F02C 7/045* (2006.01)
*F04D 29/66* (2006.01)
(Continued)

(52) U.S. Cl.
CPC ............. *F04D 29/664* (2013.01); *F02C 7/045* (2013.01); *F02K 3/06* (2013.01); *F04D 27/002* (2013.01);
(Continued)

(58) Field of Classification Search
CPC .......... F02C 7/045; F02C 7/024; F01D 25/06; F04D 29/664; F05D 2260/96; F05D 2260/962; B64D 2033/0206
See application file for complete search history.

(56) References Cited

U.S. PATENT DOCUMENTS 3,611,724 A * 10/1971 Kutney ................. F02C 7/042
                                                  60/226.1
3,637,140 A * 1/1972 Palovchik .............. B64D 33/02
                                               239/265.43
(Continued)

FOREIGN PATENT DOCUMENTS

EP        2017826 A2    1/2009
EP        2251535 A2   11/2010
(Continued)

OTHER PUBLICATIONS

European Search Report for Application No. 18160541.1-1007; dated Jul. 19, 2018; 6 pgs.

(Continued)

*Primary Examiner* — Dwayne J White
*Assistant Examiner* — Wesley Le Fisher
(74) *Attorney, Agent, or Firm* — Cantor Colburn LLP

(57) ABSTRACT

Disclosed is a flutter damper, including a chamber having an internal space, a movable diaphragm disposed at least partially within the chamber, the diaphragm separating the chamber into a first chamber and a second chamber, the second chamber forming an acoustic volume, wherein a size of the acoustic volume configures the chamber for peak acoustical energy absorption at a frequency range that is associated with one or more fan flutter modes, and a biasing member that moves the diaphragm responsive to a signal from an aircraft or engine electronic control (EEC) unit, wherein movement of the diaphragm increases or reduces the size of the acoustic volume of the second chamber.

10 Claims, 7 Drawing Sheets

(51) Int. Cl.
*F04D 29/52* (2006.01)
*F04D 27/00* (2006.01)
*F02K 3/06* (2006.01)
*B64D 33/02* (2006.01)
*F02K 1/82* (2006.01)

(52) U.S. Cl.
CPC .... *F04D 29/526* (2013.01); *B64D 2033/0206* (2013.01); *F02K 1/827* (2013.01); *F05D 2220/32* (2013.01); *F05D 2220/36* (2013.01); *F05D 2260/96* (2013.01)

(56) References Cited

U.S. PATENT DOCUMENTS

| | | | |
|---|---|---|---|
| 4,084,366 A | 4/1978 | Saylor et al. | |
| 4,235,303 A | 11/1980 | Dhoore et al. | |
| 4,291,080 A | 9/1981 | Ely et al. | |
| 4,313,524 A | 2/1982 | Rose | |
| 4,441,578 A | 4/1984 | Rose | |
| 4,452,335 A | 6/1984 | Mathews et al. | |
| 4,531,362 A | 7/1985 | Barry et al. | |
| 4,692,091 A | 9/1987 | Ritenour | |
| 4,967,550 A | 11/1990 | Acton et al. | |
| 5,005,353 A | 4/1991 | Acton et al. | |
| 5,025,888 A | 6/1991 | Arcas et al. | |
| 5,382,134 A | 1/1995 | Pla et al. | |
| 5,415,522 A | 5/1995 | Pla et al. | |
| 5,498,127 A | 3/1996 | Kraft et al. | |
| 5,590,849 A | 1/1997 | Pla | |
| 5,594,216 A | 1/1997 | Yasukawa et al. | |
| 5,919,029 A | 7/1999 | Van Nostrand et al. | |
| 5,979,593 A | 11/1999 | Rice et al. | |
| 6,085,865 A | 7/2000 | Delverdier et al. | |
| 6,379,110 B1 | 4/2002 | McCormick et al. | |
| 6,634,457 B2* | 10/2003 | Paschereit | F01N 1/02 181/219 |
| 6,811,372 B1 | 11/2004 | Emborg et al. | |
| 7,857,093 B2 | 12/2010 | Sternberger et al. | |
| 7,870,929 B2 | 1/2011 | Farstad | |
| 8,434,995 B2 | 5/2013 | Pool et al. | |
| 8,506,234 B2 | 8/2013 | Brooks et al. | |
| 8,578,697 B2 | 11/2013 | Harper | |
| 8,931,588 B2 | 1/2015 | Murray | |
| 9,097,179 B2 | 8/2015 | Brooks et al. | |
| 9,181,875 B2 | 11/2015 | Busekros et al. | |
| 10,066,548 B2 | 9/2018 | Gilson et al. | |
| 2004/0045767 A1* | 3/2004 | Byrne | F02C 7/045 181/241 |
| 2005/0109557 A1 | 5/2005 | Dravet et al. | |
| 2005/0274103 A1* | 12/2005 | Prasad | B64D 33/02 60/226.1 |
| 2005/0284690 A1 | 12/2005 | Proscia et al. | |
| 2006/0037809 A1 | 2/2006 | Fuller et al. | |
| 2008/0296431 A1* | 12/2008 | Ivers | B64D 33/02 244/1 N |
| 2009/0110541 A1 | 4/2009 | Southwick et al. | |
| 2009/0293481 A1 | 12/2009 | Bethke | |
| 2010/0206664 A1 | 8/2010 | Bagnall | |
| 2010/0284788 A1 | 11/2010 | Brooks et al. | |
| 2010/0284789 A1* | 11/2010 | Brooks | F01D 5/26 415/119 |
| 2011/0220433 A1 | 9/2011 | Nakamura et al. | |
| 2011/0266917 A1 | 11/2011 | Metzger et al. | |
| 2012/0124965 A1 | 5/2012 | Grabowski et al. | |
| 2014/0169935 A1 | 6/2014 | Schwarz et al. | |
| 2014/0233769 A1 | 8/2014 | Storm | |
| 2014/0366554 A1 | 12/2014 | Gilson et al. | |
| 2016/0076453 A1 | 3/2016 | Rolls-Royce | |
| 2016/0194968 A1 | 7/2016 | Murphy et al. | |
| 2016/0298847 A1* | 10/2016 | Nguyen | F23R 3/28 |
| 2017/0022826 A1 | 1/2017 | Read et al. | |
| 2017/0058780 A1 | 3/2017 | Kim et al. | |
| 2018/0209345 A1 | 7/2018 | Fulayter et al. | |
| 2018/0258788 A1 | 9/2018 | Morin et al. | |
| 2018/0258854 A1 | 9/2018 | Sidelkovskly et al. | |
| 2018/0258855 A1 | 9/2018 | Michaels et al. | |
| 2018/0258856 A1 | 9/2018 | Schwarz et al. | |
| 2018/0258857 A1 | 9/2018 | Dilip et al. | |
| 2018/0258955 A1 | 9/2018 | Levasseur et al. | |

FOREIGN PATENT DOCUMENTS

| | | |
|---|---|---|
| EP | 2256302 A1 | 12/2010 |
| EP | 2466095 A2 | 6/2012 |
| EP | 3187713 | 7/2017 |
| EP | 3333402 A1 | 6/2018 |
| GB | 2090334 A | 7/1982 |
| WO | 9213339 A1 | 8/1992 |
| WO | 2014189572 a2 | 11/2014 |

OTHER PUBLICATIONS

European Search Report for Application No. 18160550.2-1007; dated Jul. 19, 2018; 7 pgs.
European Search Report for Application No. 18160552.8-1007; dated Jul. 3, 2018; 12 pgs.
European Search Report for Application No. 18160554.4-1007; dated Jul. 19, 2018; 7 pgs.
European Search Report for Application No. 18160556.9-1007; dated Jul. 24, 2018; 7 pgs.
European Search Report for Application No. 18160559.3-1007; dated Jul. 24, 2018; 7 pgs.
European Search Report for Application No. 18160561.9; dated Jul. 4, 2018; 10 pgs.
Mustafi, Prateek; "Improved Turbofan Intake Liner Design and Optimization"; Feb. 12, 2013; Theisis paper Faculty of Engineering and the Enviroment, Institute of Sound and Vibration Research; Univeristy of Southampton; 196 pages.

* cited by examiner

VARIABLE DISPLACEMENT FLUTTER DAMPER FOR A TURBOFAN ENGINE

BACKGROUND

Exemplary embodiments pertain to flutter dampers in gas turbine propulsion systems and, more particularly, to flutter dampers in nacelle inlet structures.

Geared turbofan architectures, allow for high bypass ratio turbofans, enabling the use of low pressure ratio fans, which may be more susceptible to fan flutter than high pressure ratio fans. Fan flutter is an aeromechanical instability detrimental to the life of a fan blade.

Accordingly, there is a need for a flutter damper which, by absorbing the acoustic energy associated with the flutter structural mode, may prevent the fan from fluttering, and which may be integrated into the reduced available space in an optimized propulsion system.

BRIEF DESCRIPTION

Disclosed is a flutter damper, a chamber having an internal space, a movable diaphragm disposed at least partially within the chamber, the diaphragm separating the chamber into a first chamber and a second chamber, the second chamber forming an acoustic volume, wherein a size of the acoustic volume configures the chamber for peak acoustical energy absorption at a frequency range that is associated with one or more fan flutter modes, and a biasing member that moves the diaphragm responsive to a signal from an aircraft or engine electronic control (EEC) unit, wherein movement of the diaphragm increases or reduces the size of the acoustic volume of the second chamber In addition to one or more of the features described above, or as an alternative, further embodiments may include that the biasing member is a hydraulic actuator or an electric linear actuator.

In addition to one or more of the features described above, or as an alternative, further embodiments may include that the biasing member is an inflatable and deflatable bladder disposed in the first chamber.

In addition to one or more of the features described above, or as an alternative, further embodiments may include that the diaphragm includes a perimeter seal to fluidly seal the first chamber from the second chamber.

In addition to one or more of the features described above, or as an alternative, further embodiments may include a pressurized fluid supply fluidly connected to the bladder and a first valve controlled by the electronic engine control to enable or prevent fluid or gas from flowing to the bladder.

In addition to one or more of the features described above, or as an alternative, further embodiments may include that pressurized fluid is air and the flutter damper further includes a vent and a second valve controlled by the electronic engine control to enable or prevent air from venting from the bladder.

In addition to one or more of the features described above, or as an alternative, further embodiments may include a sensor in electronic communication with the electronic engine control that detects the position of the diaphragm in the chamber.

In addition to one or more of the features described above, or as an alternative, further embodiments may include a spring to counter-bias the diaphragm to an opened state that increases the acoustic volume.

In addition to one or more of the features described above, or as an alternative, further embodiments may include that the chamber is box shaped or rectangular shaped.

In addition to one or more of the features described above, or as an alternative, further embodiments may include an acoustic liner having a perforated radial inner face sheet and a radial outer face sheet, wherein the chamber is secured to the outer face sheet and is in fluid communication with the acoustic liner.

In addition to one or more of the features described above, or as an alternative, further embodiments wherein the chamber is a metallic material, including aluminum, or a plastic or a composite, or a hybrid metallic and non-metallic material.

Further disclosed is a gas turbine engine including a nacelle, and a flutter damper secured to the nacelle, the flutter damper including one or more of the above disclosed features.

Further disclosed is a method of providing flutter damping to a gas turbine engine, including determining with an electronic engine control that an acoustic volume in a chamber should change by being increased or decreased, wherein a size of the acoustic volume configures the chamber for peak acoustical energy absorption at a frequency range that is associated with one or more fan flutter modes, and actuating a biasing member to increase or decrease the acoustic volume, wherein the biasing member is a biasing member disclosed above.

In addition to one or more of the features described above, or as an alternative, further embodiments may include that the biasing member is the bladder and the method includes actuating a fluid vent valve to deflate a bladder in the chamber to move a diaphragm so as to increase the acoustic volume, or actuating a fluid supply valve to inflate the bladder in the chamber to move the diaphragm so as to decrease the acoustic volume.

In addition to one or more of the features described above, or as an alternative, further embodiments may include damping, within an acoustic liner, the acoustic liner having a perforated radial inner face sheet and a radial outer face sheet, wherein the chamber is secured to the outer face sheet and is in fluid communication with the acoustic liner.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
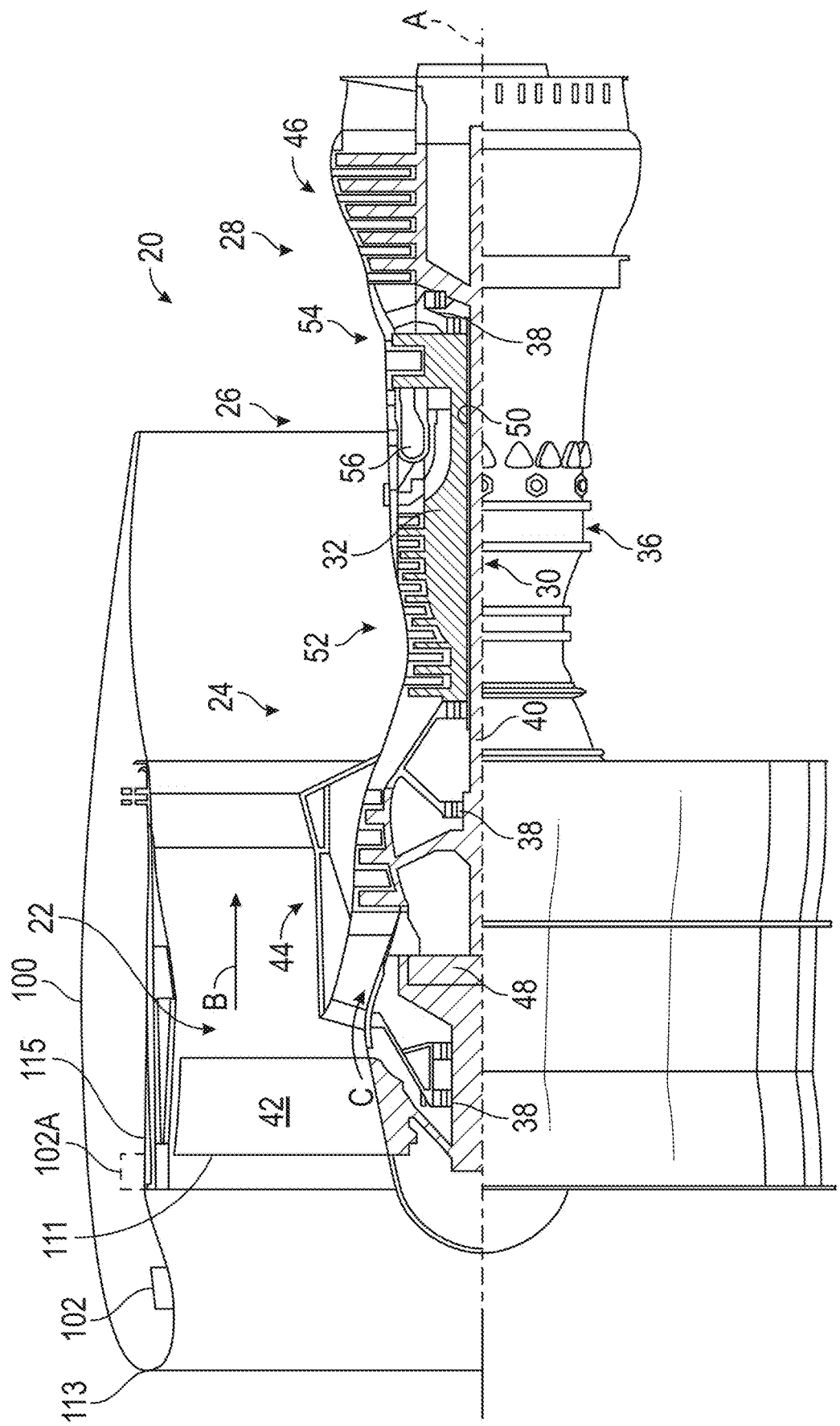
FIG. 1 is a schematic view of a gas turbine propulsion system.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via multiple bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °\text{ R})/(518.7° \text{ R})]^{0.5}$. The "Low corrected fan tip speed" as disclosed herein according to one non-limiting embodiment is less than about 1150 ft/second (350.5 m/sec).

Figure 2:
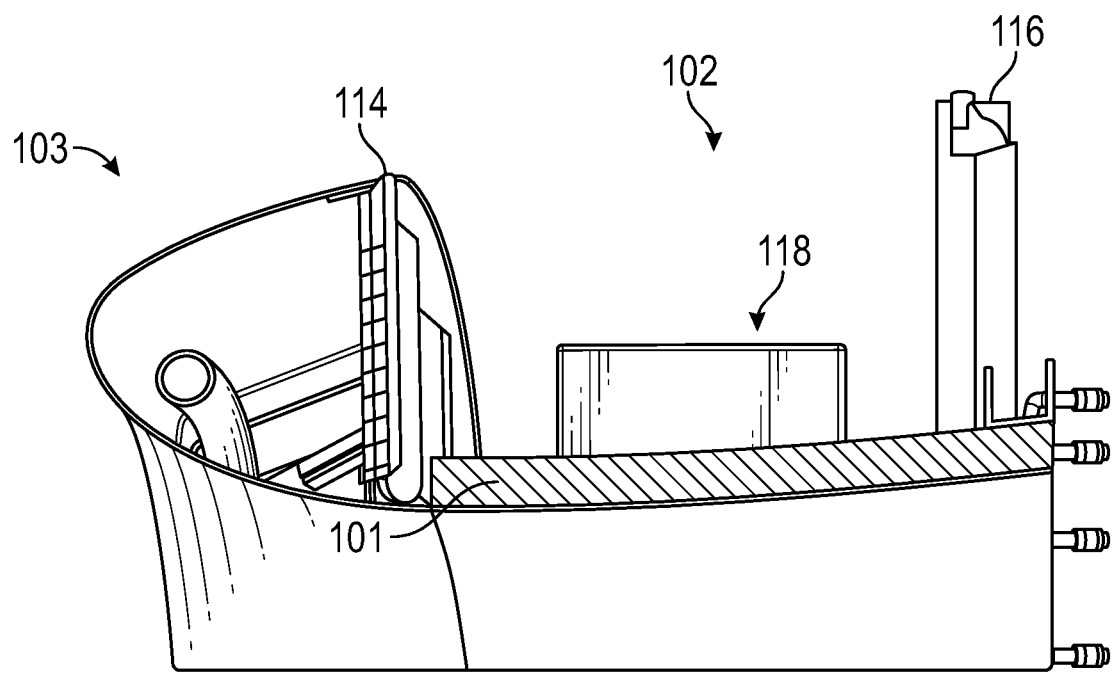
FIG. 2 illustrates a perspective cross sectional view of a flutter damper in a nacelle inlet.
Figure 3:
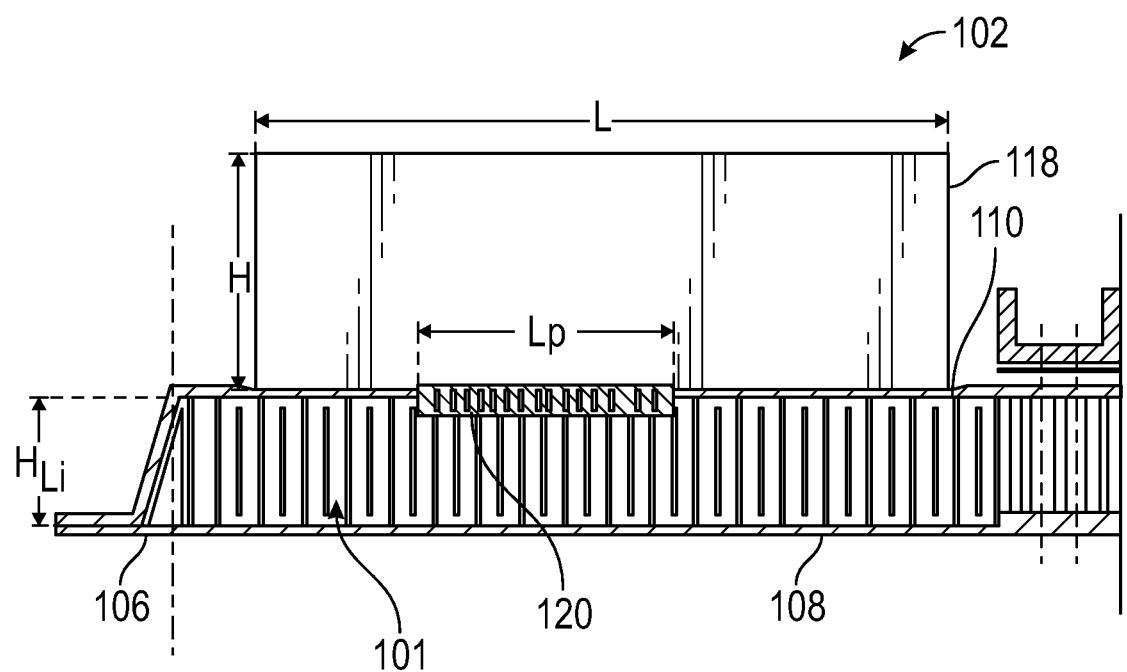
FIG. 3 is a schematic view of a flutter damper in accordance with one embodiment of the disclosure.

As illustrated in FIGS. 1 through 3, the engine 20 may include a nacelle 100 with acoustic liner 101 at the radial inside of the nacelle inlet skin 106. The acoustic liner 101 may have a perforated radial inner face sheet 108, i.e., facing a radial inside of a nacelle inlet 103, illustrated in FIG. 2, and a radial outer back sheet 110.

The acoustic liner 101 is designed to absorb energy that tends to produce community noise. As such, for contemporary high bypass ratio propulsion systems, the acoustic liner 101 typically provides for peak energy absorption in the acoustic frequency range of about between 500 and 2000 Hz, and is less effective outside this range. Fan flutter for such propulsion systems, however, typically occurs at a lower frequency, depending on the frequency and nodal diameter count of the critical structural mode. The structural frequency largely depends on the size of the fan, among other design parameters. Large fans tend to flutter at smaller frequencies than small fans. Torsion modes tend to have higher frequency than bending modes on any given fan, and either can be critical. The materials and construction techniques used to make the fan blades also have a significant influence on the frequency. Given the range of sizes, materials, and flutter critical modes in fans of modern gas turbine engines, the flutter frequency will typically occur at a frequency range of less than but not equal to 500 Hz, and more specifically between 50 and 400 Hz, yet more specifically between 50 and 300 Hz, and yet more specifically between 50 and 200 Hz.

In one embodiment, a flutter damper 102 is provided which may include the acoustic liner 101 and a chamber 118 disposed radially exterior to and in acoustic communication with the acoustic liner 101. Also a flutter damper 102 without the acoustic liner 101 is considered part of the scope of this disclosure. As used herein, radially refers to the axis A of the engine 20. Acoustic communication is provided through a perforation section 120 in the outer back sheet 110. In FIG. 2, the flutter damper 102 is illustrated as being disposed between a first axial forward nacelle bulkhead 114 and a second axial forward nacelle bulkhead 116. The flutter damper 102, however, may be disposed anywhere between a leading edge 111 of the fan 42 and a nacelle hilite 113, such as flutter damper 102A disposed on the fan case 115 illustrated in FIG. 1.

The flutter damper 102 may be configured to mitigate fan flutter by providing peak energy absorption in the acoustic frequency range associated with fan flutter modes, where such frequency range is referred to herein as a flutter frequency range. The flutter damper may have desirable impedance characteristics at certain targeted flutter frequencies, which may be defined as:

$$f_{target} = f_{S,ND} + \Omega \cdot ND$$

In the equation above, the variable $f_{S,ND}$ is the frequency, which is measured in units of Hertz, and which corresponds to a resonance frequency of a structural mode of the fan blade, which typically may be a first or second bending mode with a certain nodal diameter count, ND. The variable ND is the nodal diameter count of the circumferential pattern of the structural mode of the fan blade. The variable $\Omega$ is the rotational speed of the fan, which is measured in the units of revolutions per second. The values for variable $\Omega$ may be chosen to correspond to conditions where fan flutter may typically occur, for example, when the tip relative Mach number of the fan is between 0.85 and 1.2 during standard-day, sea-level-static operation.

From the above equation, considering the nodal diameter constraints, the targeted flutter frequency ranges may be defined to be:

$f_{S,ND}$=frequency of first or second bending mode of fan with ND nodal diameters $$1 \leq ND \leq 3$$

$$\Omega_{Mreltip=0.85} \leq \Omega \leq \Omega_{Mreltip=1.2}$$

$$f_{target} = f_{S,ND} + \Omega \cdot ND$$

In the above equation, Mreltip is the tip relative Mach number for a radial outer tip of the fan blade, and the bending mode is a vibrational mode of the fan blade. The symbol $\Omega_{Mreltip=0.85}$ denotes the rotational speed where the tip relative Mach number is equal to 0.85; likewise, $\Omega_{Mreltip=1.2}$ denotes the rotational speed where the tip relative Mach number is equal to 1.2, Of course, values greater or lesser than the aforementioned values are considered to be within the scope of the present disclosure.

Within the flutter frequency ranges associated with the first and second bending mode, and more specifically at the targeted frequencies, the flutter damper may have the following impedance characteristics:

$$R \geq 2\rho c$$

$$-3\rho c \leq X \leq -0.6\rho c$$

Again, these values may vary and fall within the scope of the present disclosure. The above equation references the impedance of the flutter damper, defined as the complex ratio of the amplitude and phase of pressure oscillations over the amplitude and phase of the acoustic velocity as a function of frequency. In addition, the equation references the real part of impedance is the resistance, which is variable R, and the imaginary part of impedance is the reactance, which is variable X. The variable $\rho$ is the air density, and the variable c is the sound speed, both being at the entrance to the flutter damper. The resistance constraint on R may facilitate integration of the flutter damper into acoustic liners, which typically have R values greater than $2\rho c$ in locations forward of the fan. The reactance constraint on X optimizes the flutter inhibiting capability of the device at operating conditions typically encountered in commercial aircraft applications. At certain target frequencies, the flutter damper may satisfy the following additional constraint:

$$0.0143 \leq \frac{V f_{target}}{Sc} \leq 0.165$$

Figure 4A:
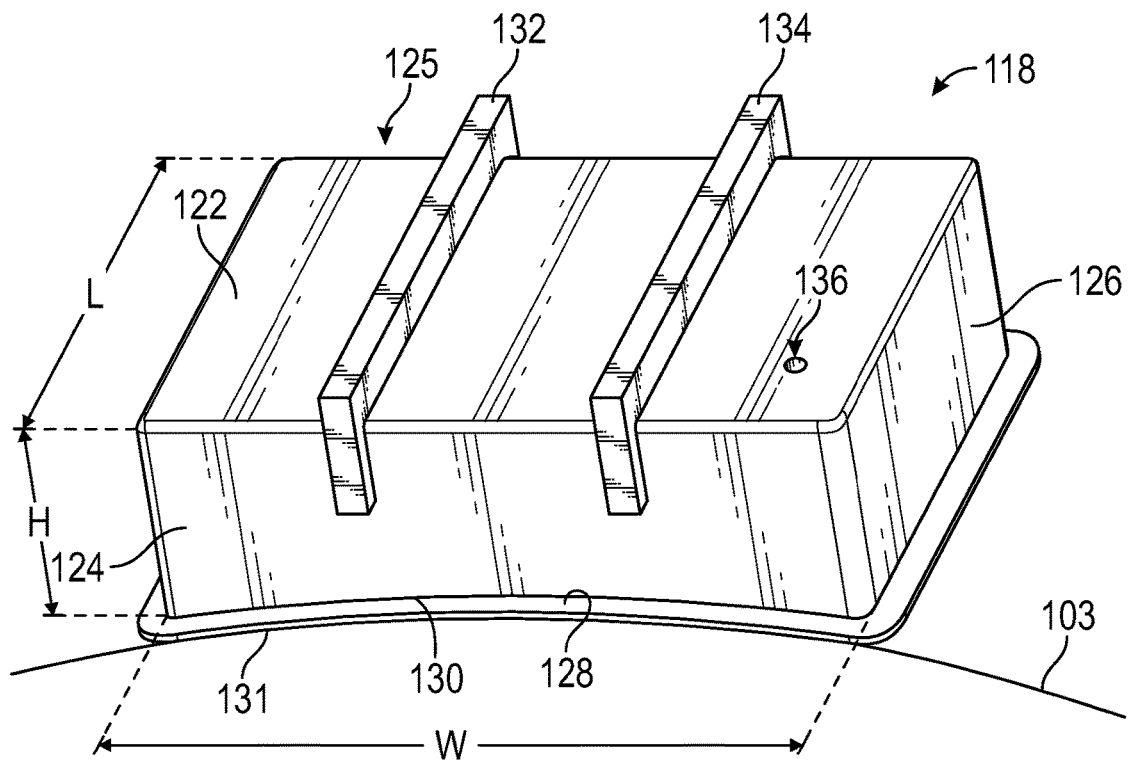
FIGS. 4A and 4B illustrate perspective views of one chamber of a flutter damper in accordance with one embodiment of the disclosure.
Figure 4B:
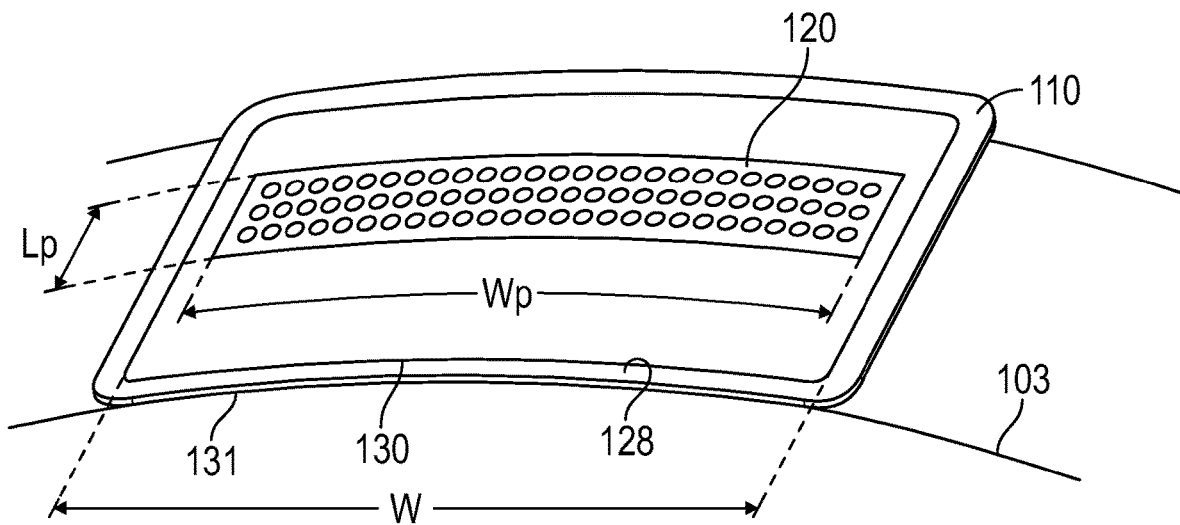

Again, these values may vary and fall within the scope of the present disclosure. As illustrated in FIGS. 3, 4A and 4B, discussed in greater detail below, the chamber 118 has a width W, a height H, and a length L. In addition, the perforated section 120 disposed under the chamber 118 has a width Wp and a length Lp, and the acoustic liner 101 has a height $H_{Li}$. Thus, in the above equation, the volume of the flutter damper 102, which includes the volume (W×H×L) of chamber 118 and the volume (Wp×$H_{Li}$×Lp) of the acoustic liner 101 is variable V. The area of the perforated section 120 (Wp×Lp) disposed under the chamber 118 is variable S. The units of V, S, c and $f_{target}$ are chosen such that $$\frac{V f_{target}}{Sc}$$

is non-dimensional.

Moreover, in one embodiment, a downstream edge of the chamber 118 may be located at B/D≤0.35. In this equation, the variable B is the distance between the downstream edge of the chamber 118 and the fan tip leading edge, and the variable D is the fan tip diameter at the leading edge of the fan blade.

Remaining with FIGS. 1-3, the illustrated flutter damper 102 designed according to the above constraints, has the benefit of being able to fit within smaller footprints of sized-optimized propulsion systems, providing a retrofittable solution to an existing engine inlet. Thus the disclosed flutter damper 102 may help boost fan flutter margin without requiring an inlet redesign. In addition, the flutter damper 102 may provide a relatively lightweight solution, that is, the low temperatures of the inlet area may allow for the use of a metallic material, including aluminum, or a plastic or a composite, or a hybrid metallic and non-metallic material. Moreover, the flutter damper 102 may have a scalable design which can be oriented in an array of chambers, discussed in detail, below, and as illustrated in at least FIG. 5. For example, the array of chambers and may be placed around an engine inlet circumference to achieve a desired amount of flutter dampening volume.

As illustrated in FIGS. 4A and 4B, the perforation section 120 in the outer back sheet 110 may be rectangular in shape with length Lp and width Wp, where the length direction Lp corresponds to the engine axial direction, and the width direction Wp corresponds to the engine circumferential direction. For a contemporary high bypass ratio propulsion system, which may have a fan diameter of about 80 inches, and a fan rotor hub-to-tip ratio of about 0.3, the length Lp may be about four and half (4.5) inches for the chamber 118, and the width Wp may be about twelve (12) inches for chamber 118. Each perforation section 120 may have a hole-diameter of about thirty thousandths (0.030) of an inch. Of course, dimensions greater or lesser than the aforementioned dimensions, and non-rectangular shapes are considered to be within the scope of the present disclosure. This perforation geometry provides an open area that may be about four and half (4.5) percent of the surface area (Lp× Wp) of the chamber 118 against the outer back sheet 110, which may be the same open area as a perforation section (not illustrated) in the inner face sheet 108. Again, these dimensions may vary and remain within the scope of the present disclosure.

The chamber 118 may be sized to optimally dampen fan flutter at a specific fan flutter frequency and nodal diameter. The nodal diameter count represents the nodal lines of vibrational modes observed for the fan blade, which typically may be between 1 and 3. The chamber 118 in FIG. 2, for example, is shaped as a rectangular box, and non-rectangular shapes are also within the scope of the disclosure, and may be sized based on an observed flutter frequencies and nodal diameters for a given engine. For example, if an engine has an observable flutter mode at a frequency of about 150 Hz with nodal diameter 2, the chamber 118 may be sized according to that flutter mode and nodal diameter.

The box shape, as illustrated in FIG. 4A, may have a top surface 122 roughly defined by a width-length (W×L) area, where the length direction L corresponds to the engine axial direction, and the width direction W corresponds to the engine circumferential direction. The box shape may also have a front surface 124 and a back surface 125, each roughly defined by a height-width (H×W) area, where the height direction H for the chamber 118 may correspond to an engine radial direction. The box shape may further have a side surface 126 roughly defined by a height-length (H×L) area. Again, these dimensions may vary and remain within the scope of the present disclosure.

For the exemplary embodiment, the chamber 118 is twelve (12) inches wide, as referenced above, and the chamber width-height-length (W×H×L) volume may be three hundred twenty four (324) cubic inches, and the height H may be equal to, or less than, six (6) inches.

Turning now to FIGS. 4A and 4B, the box shaped chamber 118 may have a bottom edge 128 that geometrically conforms to the annular and axial profile shape of the nacelle inlet 103. Extending axially and circumferentially outwardly from the bottom edge 128 of the chamber 118 is a mounting flange 130 for affixing the chamber 118 to an existing nacelle inlet 103. As such, the bottom face 131 of the chamber 118 may be formed by the radial outer back sheet 110 of the acoustic liner 101.

The chamber 118 may also include first and second stiffening structures 132, 134. The stiffening structures 132, 134 may have a substantially "C" shape, when viewing into the side surface 126 of the chamber 118, which protrudes outwardly from the top 122, front 124 and back 125 surfaces of the chamber 118. The stiffening structures 132, 134 may divide the top surface 122 of the chamber 118 in substantially equal portions in the width direction W. The stiffening structures 132, 134 may tune the structural resonance frequencies of the chamber 118 away from the fan flutter frequencies to avoid fan flutter inducing resonance in the chamber 118. For example, the stiffening structures 132, 134 may tune the structural resonance frequencies of the relatively large, flat top surface 122 of the chamber 118 out of the targeted flutter frequency range. In addition, the stiffening structures 132, 134 add structural rigidity and may allow for a lightweight design of the chamber 118.

One or more weep holes 136 may be provided to allow for water or fluid egress. The placement of the weep holes 136 is selected to be below the engine centerline.

Figure 5:
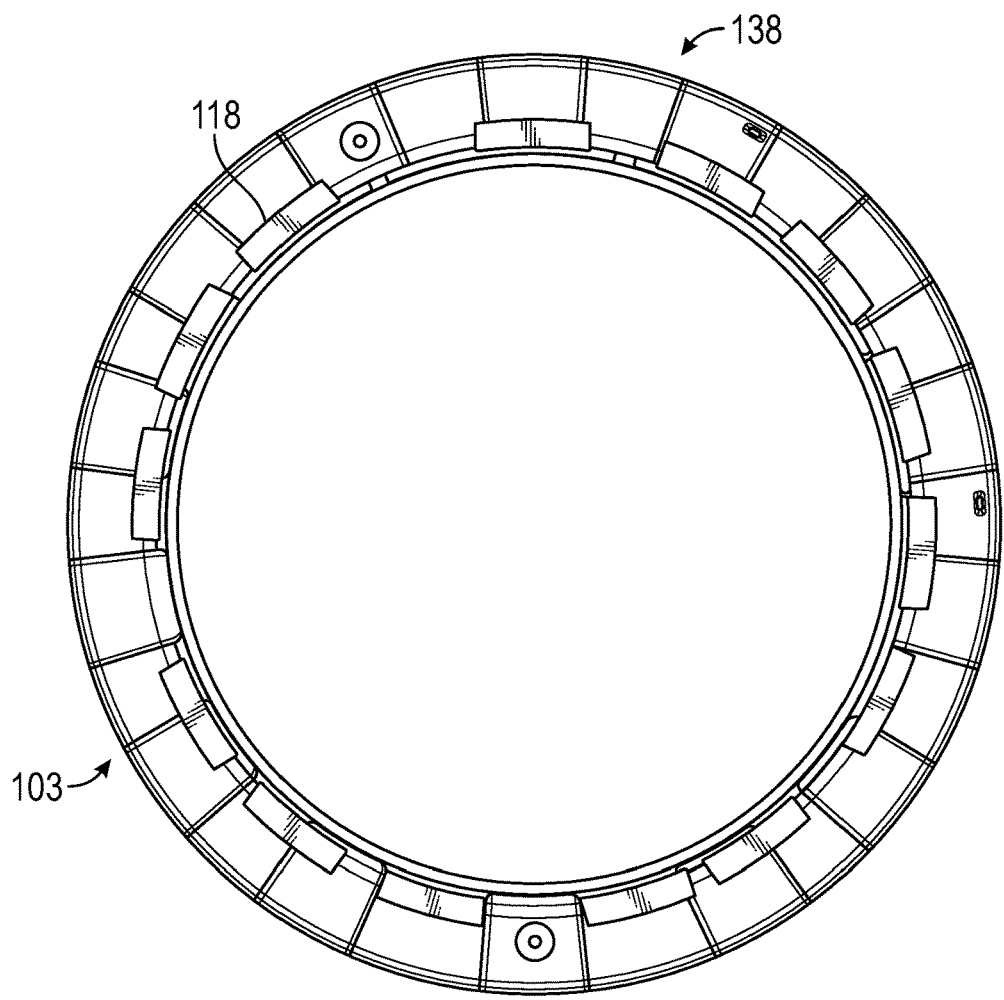
FIG. 5 illustrates an array of chambers of flutter dampers integrated into the nacelle inlet.
Figure 6:
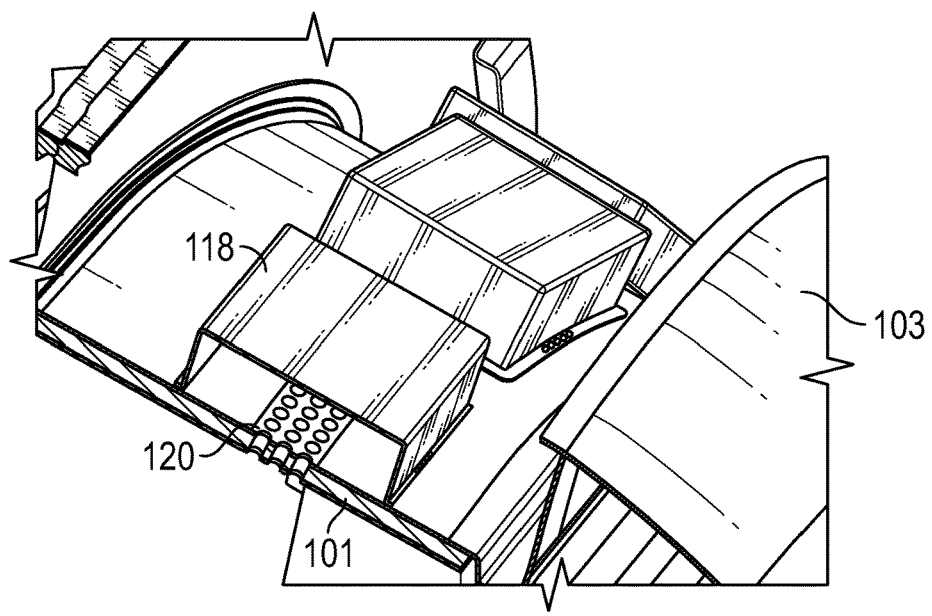
FIG. 6 is a perspective view of a portion of the nacelle inlet.

Turning now to FIGS. 5 and 6 a circumferential array 138 of chambers 118, including fourteen (14) chambers 118, is disposed about the nacelle inlet 103, with each of the chambers 118 having a perforated section. Disposing the chambers 118 in this type of circumferential array 138 achieves a desired damping volume.

Figure 7:
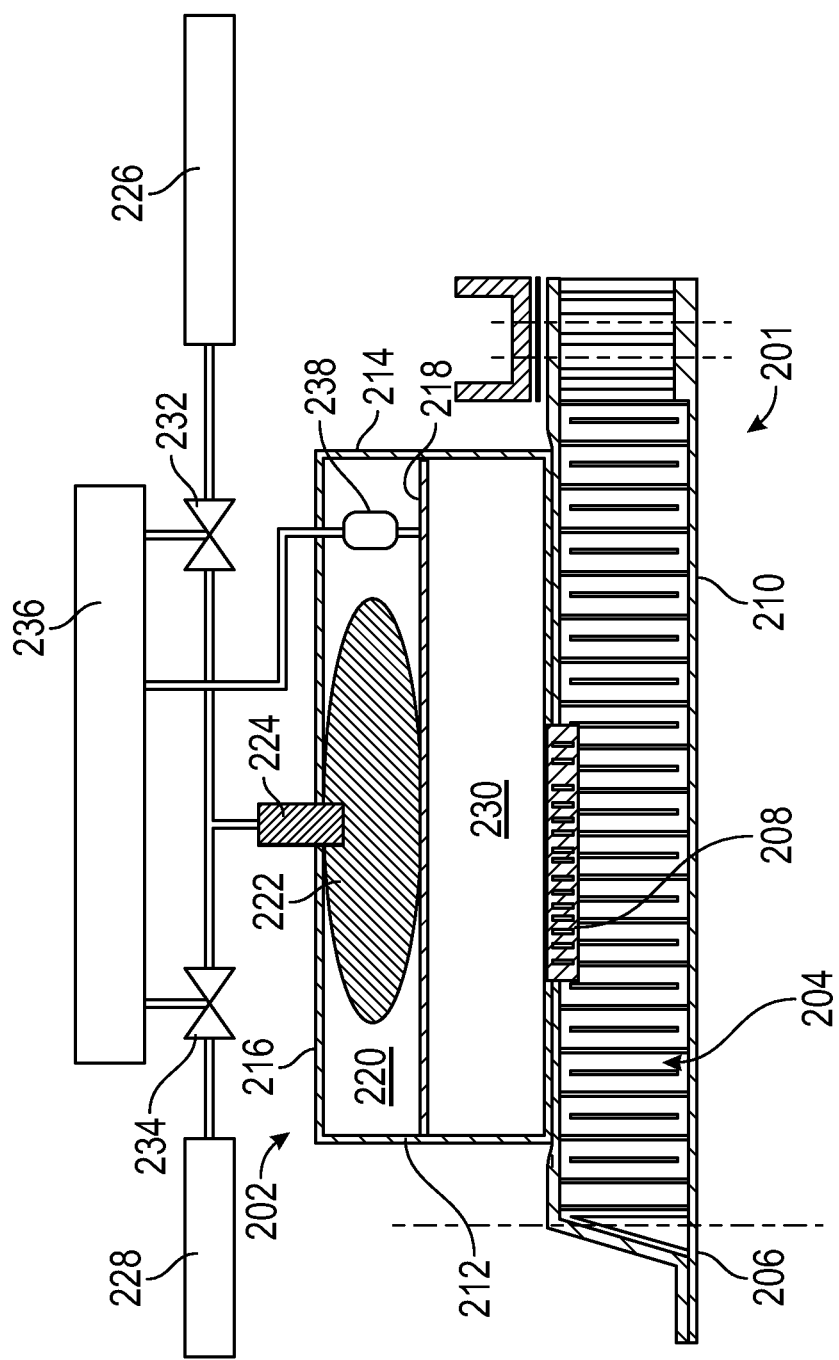
FIG. 7 is a schematic view of a flutter damper with two chambers according to one embodiment of the disclosure.

Turning now to FIG. 7, disclosed is an actively controlled flutter damper 201. The flutter damper 201 may include a chamber 202 and an acoustic liner radially inside of the chamber 202. The acoustic liner 204 may be radially outside of an inlet flow surface 206. A first perforated surface 208 may fluidly connect the chamber 202 to the acoustic liner 204, and a second perforated surface 210 may fluidly connect the acoustic liner 204 to the inlet airflow. The chamber 202 may have axially spaced front and back surfaces 212, 214, circumferentially spaced first and second side surfaces, e.g., surface 126 in FIG. 4, and a top surface 216.

The chamber 202 includes a diaphragm 218 that extends parallel to the top surface 216 of the chamber 202 and divides the chamber 202 into two internal chambers. A first internal chamber 220, on the radially outer side of the chamber 202, includes a biasing member 222, which is illustrated as being a bladder 222, or gas/hydraulic actuator. The bladder 222 is fluidly connected to the exterior side of the top surface 216 by a nozzle 224. Through the nozzle 224, the bladder 222 is controllably expanded with air supplied from a compressed gas source 226, or collapsed by exhausting air to an overboard vent 228. The compressed gas source 226 can either be engine compressor air, or another high pressure source, such as a separate pump or auxiliary power unit (APU). The vent 228 may be an ambient outlet.

On the radial inner side of the diaphragm 218 in the variable acoustic volume damping chamber 202, there may be a second chamber 230, which may be fluidly coupled to the acoustic liner 204 and may define an acoustic volume. The damping characteristics of the chamber 202 may be changed by changing the size of the acoustic volume, which may be accomplished by moving the diaphragm 218 radially inwardly and outwardly. The diaphragm 218 may move based on the fill volume of the bladder 222. In addition, the perimeter of the diaphragm may have a seal, which may fluidly separate the first and second chambers 220, 230.

Flow from the compressed gas source 226 may be controlled through a first electronic valve 232, and flow to the overboard vent 228 may be controlled through a second electronic valve 234. Operation of the valves 232, 234 may be controlled from an engine or aircraft electronic controller 236. The electronic controller 236 may communicate with a sensor 238, such as a linear variable differential transformer (LVDT), connected to the bladder 222, to measure the location of the diaphragm 218 within the chamber 202.

It is also envisioned to someone skilled in the art that the bladder 222 could be replaced with other positioning devices such as hydraulic or electric linear actuators. That is, the bladder 222 is merely one embodiment (which is shown in the drawing for illustrative purposes only) and which could be replaced by any of the other aforementioned biasing mechanisms/techniques.

Figure 8:
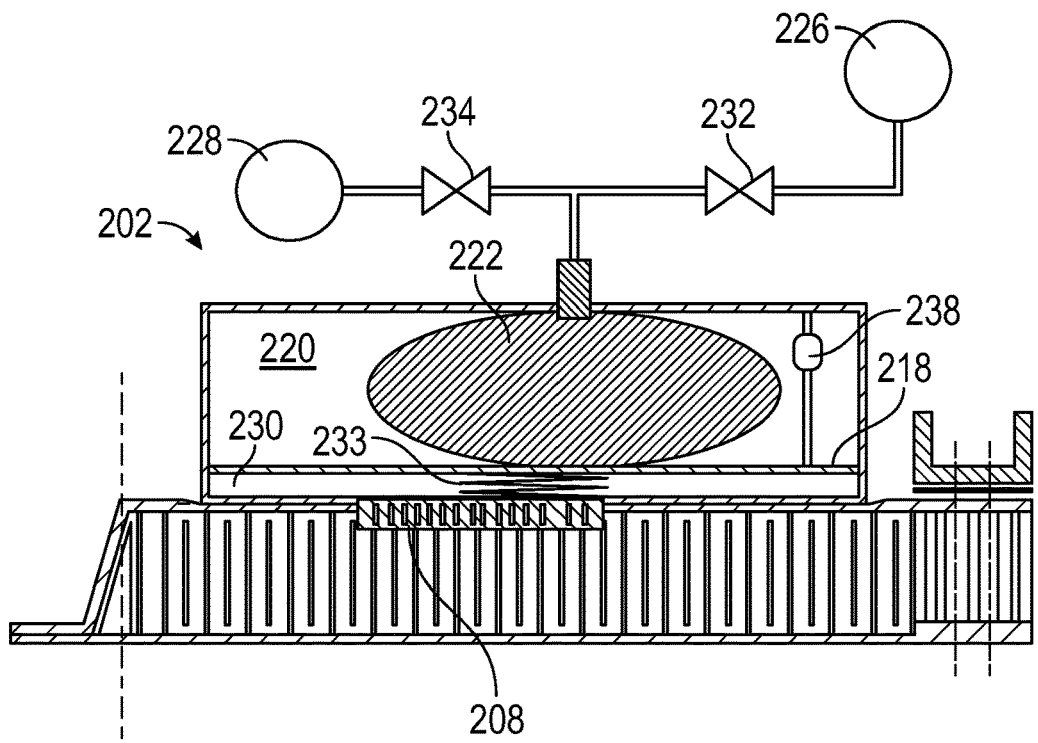
FIG. 8 illustrates a flutter damper with two chambers according to an embodiment.
Figure 9:
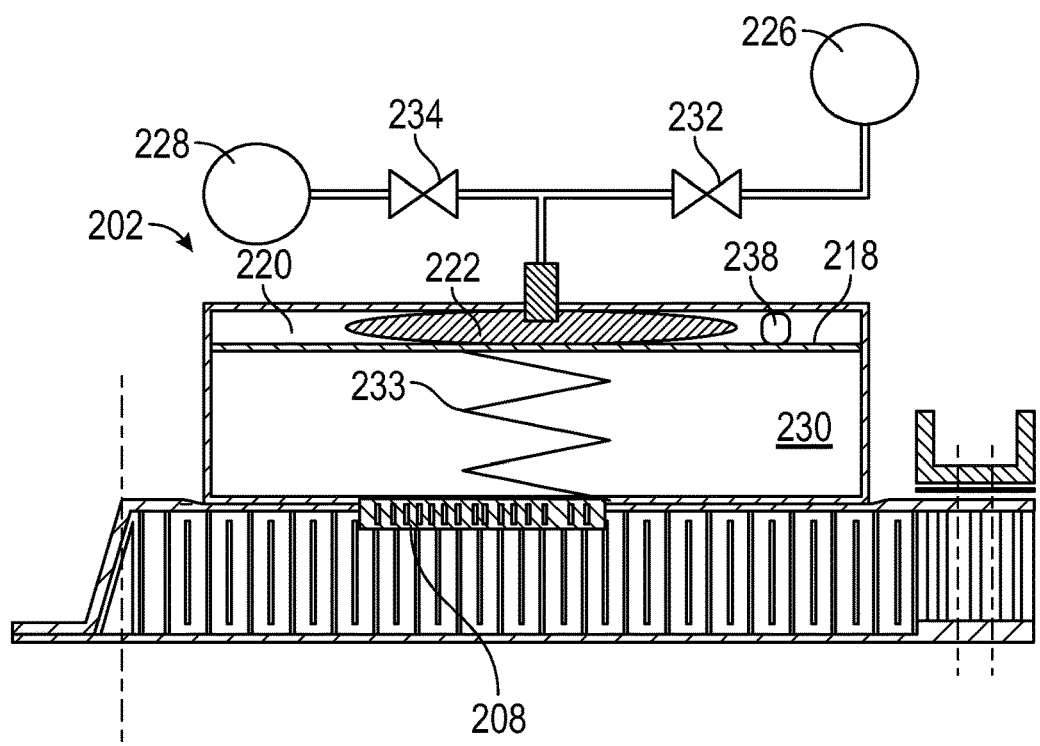
FIG. 9 illustrates a flutter damper with two chambers according to an embodiment.
Figure 10:
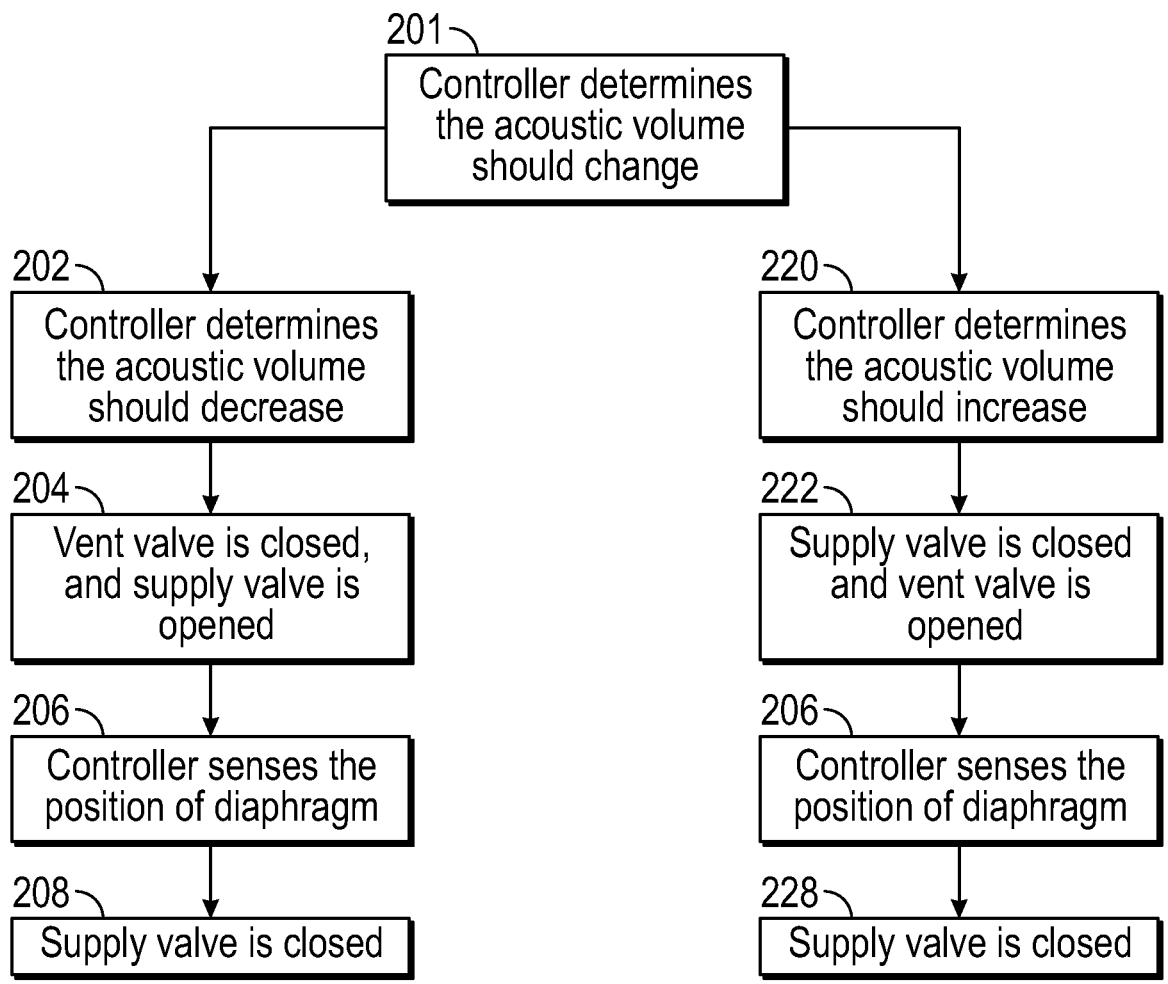
FIG. 10 illustrates a method for a flutter damper to provide acoustical energy absorption according to an embodiment.

Turning now to FIGS. 7-10, a method of actively controlling the volume of the variable acoustic volume damping chamber 202 is illustrated. At Step 201, the controller 236 determines that the acoustic volume should change to provide required flutter damping. With further reference to FIGS. 8 and 10, at Step 202 the controller 236 determines that the acoustic volume 230 should decrease. At Step 204, the vent valve 234 is electronically closed, and the supply valve 232 is electronically opened. This allows the bladder 222 to expand by being exposed to gas from the compressed gas source 226. At Step 206, the controller 236 continuously senses the position of the diaphragm 218, with the diaphragm position sensor 238, until a desired position of the diaphragm 218 in the chamber 202 is reached. At Step 208, the supply valve 232 is electronically closed.

Alternatively, with further reference to FIGS. 9 and 10, at Step 220 the controller 236 determines that the acoustic volume should increase to provide required flutter damping. To deflate the bladder 222, and increase the acoustic volume in the bottom chamber 230, the following steps are performed. At Step 222, the supply valve 232 is electronically closed and the vent valve 234 is electronically opened. This allows the bladder 222 to deflate by venting bladder gas into the atmosphere. At Step 226, the controller 236 continuously senses the position of the diaphragm 218, with the diaphragm position sensor 238, until a desired position of the diaphragm 218 in the chamber 202 is reached. At Step 228, the vent valve 234 is electronically closed. The bottom chamber 230 or upper chamber 220 may also incorporate a spring 233 to counter-bias the diaphragm 218 to the open position shown in FIG. 9, towards increasing the acoustic volume, when venting of the bladder 222.

Accordingly, the preceding disclosed embodiment provides a variable acoustic volume damping chamber 202. The chamber 202 may be installed with relatively minimal modifications to an engine inlet structure. The variability in the acoustic volume may be tuned, i.e., adjusted, for acoustic or aeromechanical requirements as required during operation or via a preprogramed operation.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flutter damper, comprising:
   a chamber having an internal space;
   a movable diaphragm disposed at least partially within the chamber, the diaphragm separating the chamber into a first chamber and a second chamber, the second chamber forming an acoustic volume, wherein a size of the acoustic volume configures the chamber for peak acoustical energy absorption at a frequency range that is associated with one or more fan flutter modes; and
   a biasing member that moves the diaphragm responsive to a signal from an aircraft or engine electronic control (EEC) unit, wherein movement of the diaphragm increases or reduces the size of the acoustic volume of the second chamber; wherein
   the biasing member is an inflatable and deflatable bladder disposed in the first chamber, the diaphragm includes a parameter seal to fluidly seal the first chamber from the second chamber, and
   the flutter damper further includes:
   a pressurized fluid supply fluidly connected to the bladder and a first valve controlled by the electronic engine control to enable or prevent fluid from flowing to the bladder, the pressurized fluid being air;
   a vent and a second valve controlled by the electronic engine control to enable or prevent air from venting from the bladder;
   a sensor in electronic communication with the electronic engine control that detects the position of the diaphragm in the chamber; and
   a spring to counter-bias the diaphragm to an opened state that increases the acoustic volume.

2. The flutter damper of claim 1, wherein the chamber is box or rectangular shaped.

3. The flutter damper of claim 1, including an acoustic liner having a perforated radial inner face sheet and a radial outer face sheet, wherein the chamber is secured to the outer face sheet and is in fluid communication with the acoustic liner.

4. The flutter damper of claim 1, wherein the chamber is a metallic material, including aluminum, or a plastic or a composite, or a hybrid metallic and non-metallic material.

5. A gas turbine engine comprising:
   a nacelle; and
   a flutter damper secured to the nacelle, the flutter damper including:
   a chamber having an internal space;
   a movable diaphragm disposed at least partially within the chamber, the diaphragm separating the chamber into a first chamber and a second chamber, the second chamber forming an acoustic volume, wherein a size of the acoustic volume configures the chamber for peak acoustical energy absorption at a frequency range that is associated with one or more fan flutter modes; and
   a biasing member that moves the diaphragm responsive to a signal from an aircraft or engine electronic control (EEC) unit, wherein movement of the diaphragm increases or reduces the size of the acoustic volume of the second chamber; wherein the biasing member is an inflatable and deflatable bladder disposed in the first chamber, the diaphragm includes a parameter seal to fluidly seal the first chamber from the second chamber, and the flutter damper further includes:

a pressurized fluid supply fluidly connected to the bladder and a first valve controlled by the electronic engine control to enable or prevent fluid from flowing to the bladder, the pressurized fluid being air;

a vent and a second valve controlled by the electronic engine control to enable or prevent air from venting from the bladder;

a sensor in electronic communication with the electronic engine control that detects the position of the diaphragm in the chamber; and a spring to counter-bias the diaphragm to an opened state that increases the acoustic volume.

6. The gas turbine engine of claim 5, wherein the chamber is box shaped or rectangular shaped.

7. The gas turbine engine of claim 5, wherein the chamber is a metallic material, including aluminum, or a plastic or a composite, or a hybrid metallic and non-metallic material.

8. A method of providing flutter damping to a gas turbine engine, comprising:

determining with an electronic engine control that an acoustic volume in a chamber should change by being increased or decreased, wherein a size of the acoustic volume configures the chamber for peak acoustical energy absorption at a frequency range that is associated with one or more fan flutter modes; and actuating a biasing member to increase or decrease the acoustic volume, wherein, the biasing member is an inflatable and deflatable bladder, and the method includes: actuating a fluid vent valve to deflate a bladder in the chamber to move a diaphragm so as to increase the acoustic volume, or actuating a fluid supply valve to inflate the bladder in the chamber to move the diaphragm so as to decrease the acoustic volume; and the flutter damper includes a sensor in electronic communication with the electronic engine control that detects the position of the diaphragm in the chamber, and the chamber includes a spring to counter-bias the diaphragm to an opened state that increases the acoustic volume.

9. The method of claim 8, wherein the chamber is box or rectangular shaped.

10. The method of claim 8, further including damping, within an acoustic liner, the acoustic liner having a perforated radial inner face sheet and a radial outer face sheet, wherein the chamber is secured to the outer face sheet and is in fluid communication with the acoustic liner.

* * * * *